US009511636B2

(12) United States Patent
Kuo (10) Patent No.: US 9,511,636 B2
(45) Date of Patent: Dec. 6, 2016

(54) JOINT STRUCTURE FOR AN AIR NOZZLE

(71) Applicant: DIRO TECH CORP., Changhua County (TW)

(72) Inventor: Chung-Tsun Kuo, Changhua County (TW)

(73) Assignee: Diro Tech Corp., Changhua County (TW)

( * ) Notice: Subject to any disclaimer, the term of this patent is extended or adjusted under 35 U.S.C. 154(b) by 1053 days.

(21) Appl. No.: 13/653,514

(22) Filed: Oct. 17, 2012

(65) Prior Publication Data

US 2013/0133769 A1 May 30, 2013

(30) Foreign Application Priority Data

Nov. 30, 2011 (TW) .............................. 100143915 A (51) Int. Cl.
| | | |
|---|---|---|
| F16L 37/138 | (2006.01) | |
| B60C 29/06 | (2006.01) | |
| F16L 37/10 | (2006.01) | |
| F16L 37/12 | (2006.01) | |

(52) U.S. Cl.
CPC .............. B60C 29/06 (2013.01); F16L 37/101 (2013.01); F16L 37/1215 (2013.01); F16L 37/138 (2013.01); Y10T 137/9247 (2015.04)

(58) Field of Classification Search
CPC .. F16L 37/1215; F16L 37/138; F16L 37/101

USPC ............ 285/33, 34, 35, 314–316; 251/149.1, 251/149.6; 137/223, 322
See application file for complete search history.

(56) References Cited

U.S. PATENT DOCUMENTS 1,477,440 A * 12/1923 Grier, Jr. ............. F16L 37/1215
279/71
1,902,919 A    3/1933 Talbot
(Continued)

FOREIGN PATENT DOCUMENTS

DE           3023908     † 1/1982
GB           466643      † 6/1937
(Continued)

Primary Examiner — Michael P Ferguson
Assistant Examiner — Jay R Ripley
(74) Attorney, Agent, or Firm — Alan D. Kamrath; Kamrath IP Lawfirm, P.A.

(57) ABSTRACT

A joint structure for an air nozzle contains a valve joint connected on an air nozzle to fill air, with the air nozzle including outer threads defined around an outer peripheral side thereof. The valve joint includes a body having a hole defined therein, an inlet communicating with the hole, and at least one orifice penetrating from an exterior environment to the hole. At least one limiting member is secured and moves in the at least one orifice and has meshing teeth formed on one end thereof to correspond to the hole. The meshing teeth engage with the outer threads of the air nozzle. The at least one limiting member has a defining segment arranged on another end thereof. A controlling assembly is fitted on the body and is used to control the at least one limiting member to move in the at least one orifice.

8 Claims, 14 Drawing Sheets

(56) References Cited

U.S. PATENT DOCUMENTS

| | | | |
|---|---|---|---|
| 2,003,039 A | 5/1935 | Crowley | |
| 2,152,375 A | 3/1939 | Crowley | |
| 2,463,179 A * | 3/1949 | Iftiger, Sr. | F16L 37/10 285/314 |
| 2,837,350 A | 6/1958 | Druge | |
| 3,442,541 A * | 5/1969 | Metz | F16B 7/10 285/24 |
| 3,635,501 A * | 1/1972 | Thorne-Thomsen | F16L 37/1215 285/314 |
| 2002/0046772 A1 † | 4/2002 | Blom | |
| 2008/0084062 A1 † | 4/2008 | Krohn | |
| 2008/0190489 A1 † | 8/2008 | Wrubel | |

FOREIGN PATENT DOCUMENTS

| | | | |
|---|---|---|---|
| GB | 764093 | † | 12/1956 |
| GB | 1363054 | † | 8/1974 |
| JP | 2001225729 | † | 8/2001 |

\* cited by examiner
† cited by third party

JOINT STRUCTURE FOR AN AIR NOZZLE

BACKGROUND OF THE INVENTION

1. Field of the Invention

The present invention relates to a joint structure for an air nozzle and, more particularly, to a joint structure for connecting a valve joint with an air nozzle to fill air stably.

2. Description of the Prior Art

A conventional air filling method contains a rotary engagement. A valve joint is engaged with an air nozzle quickly by ways of a compressed rubber. Yet, such an engagement cannot fill air at a high pressure stably. Another air filling method is a thread rotation. The valve joint is screwed with the air nozzle by screwing male threads with female threads to fill air at a high pressure, but such a thread rotation is slow and is operated manually.

The present invention has arisen to mitigate and/or obviate the afore-described disadvantages.

SUMMARY OF THE INVENTION

The primary object of the present invention is to provide a joint structure for an air nozzle which when a controlling assembly of the valve joint does not limit at least one limiting member, a user allows inserting an air nozzle into the hole of the valve joint by one hand, with the controlling assembly rotating with an insertion force to shift the controlling assembly to limit the at least one limiting member or after inserting the air nozzle, the controlling assembly rotates directly and shifts to limit the at least one limiting member, thus operating the valve joint easily and smoothly.

Another object of the present invention is to provide a joint structure for an air nozzle which when connecting the valve joint with the air nozzle, outer threads of the air nozzle engage with meshing teeth of the at least one limiting member to limit or not limit the at least one limiting member by shifting the controlling assembly, and the meshing teeth engage with the outer threads of the air nozzle to limit the air nozzle in the hole. Thus, the valve joint is connected with the air nozzle quickly, has a small size, is assembled securely, and is suitable for a high-pressure air fill.

A joint structure for an air nozzle in accordance with a preferred embodiment of the present invention contains a valve joint connected on an air nozzle to fill air, with the air nozzle including outer threads defined around an outer peripheral side thereof. The valve joint includes:

a body having a hole defined therein, an inlet communicating with the hole, and at least one orifice penetrating from an exterior environment to the hole;

at least one limiting member secured and moving in the at least one orifice and having meshing teeth formed on one end thereof to correspond to the hole, with the meshing teeth engaging with the outer threads of the air nozzle, and with the limiting member having a defining segment arranged on another end thereof; and a controlling assembly fitted on the body and used to control the at least one limiting member to move in the at least one orifice.

A joint structure for an air nozzle in accordance with another preferred embodiment of the present invention contains a valve joint being connected on an air nozzle to fill air, with the air nozzle including outer threads defined around an outer peripheral side thereof. The valve joint is a Presta valve join and includes:

a body having a hole defined therein, an inlet communicating with the hole, at least one orifice penetrating from an exterior environment to the hole, a second seal ring disposed on one end of an outer peripheral side thereof and a third seal ring mounted on another end of the outer peripheral side thereof, with the second seal ring and the third seal ring provided to close a front side and a rear side of the at least one orifice;

at least one limiting member secured and moving in the at least one orifice; and a controlling assembly fitted on the body and used to control the at least one limiting member to move in the at least one orifice or to limit a movement of the at least one limiting member.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Referring to FIGS. 1-4, a joint structure for an air nozzle according to a first embodiment of the present invention comprises a valve joint 1 connected on an air nozzle 2 to fill air, and the air nozzle 2 includes outer threads 3 defined around an outer peripheral side thereof. The valve joint 1 is a Presta valve joint and includes a body 10 having a hole 11 defined therein, an inlet 12 communicating with the hole 11, and at least one orifice 13 penetrating from an exterior environment to the hole 11. The at least one orifice 13 is non-circular. The body 10 also has a middle cylinder 10A, a front cylinder 10B, and a rear cylinder 10C. The front cylinder 10B is screwed with one end of the middle cylinder 10A and is used to fix a first seal ring 14. The rear cylinder 10C is screwed with another end of the middle cylinder 10A and is applied to fix a compression spring 15. The body 10 further has a second seal ring 16 disposed on one end of an outer peripheral side and on the middle cylinder 10A thereof and a third seal ring 17 mounted on another end of the outer peripheral side thereof and the rear cylinder 10C. The second seal ring 16 and the third seal ring 17 are provided to close a front side and a rear side of the at least one orifice 13. The first seal ring 14 is served to close the air nozzle 2, and the compression spring 15 is used for pushing the air nozzle 2.

At least one limiting member 20 is secured and moves in the at least one orifice 13 and has meshing teeth 21 formed on one end thereof to correspond to the hole 11. The meshing teeth 21 engages with the outer threads 3 of the air nozzle 2, and the limiting member 20 has a defining segment 22 arranged on another end thereof.

A controlling assembly 30 is formed in a hollow cylinder shape and is fitted on the body 10. The controlling assembly 30 is used to control the at least one limiting member 20 to move in the at least one orifice 13 and has a push protrusion 31 defined therein. The controlling assembly 30 moves so that the push protrusion 31 pushes and limits the defining segment 22 of the at least one limiting member 20, such that the at least one limiting member 20 is controlled by the controlling assembly 30 to move.

A spring 40 is defined between the body 10 and the at least one limiting member 20 and is used to push the at least one limiting member 20 to move outwardly.

Figure 1:
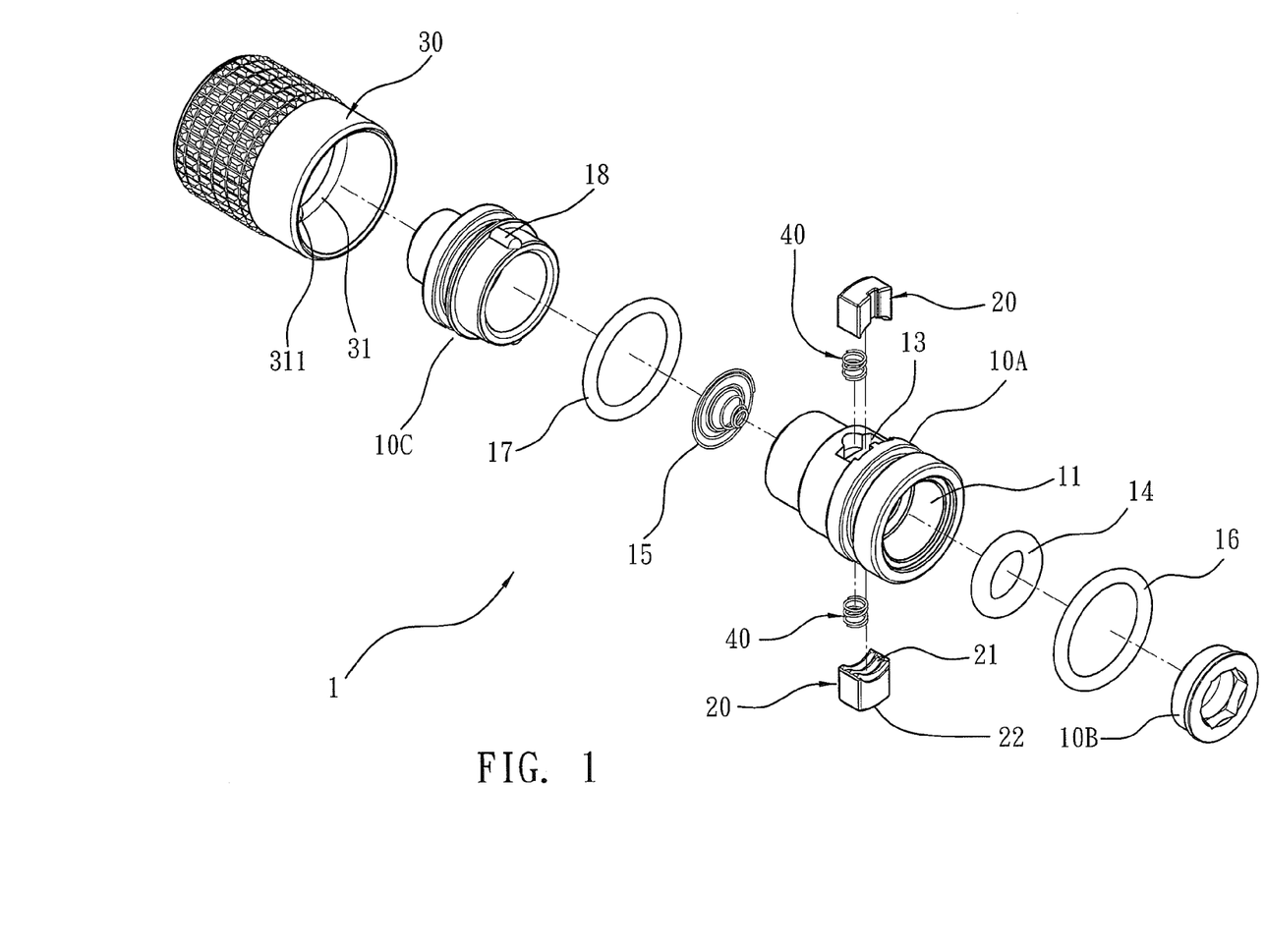
FIG. 1 is a perspective view showing the exploded components of a joint structure for an air nozzle according to a first embodiment of the present invention.
Figure 2:
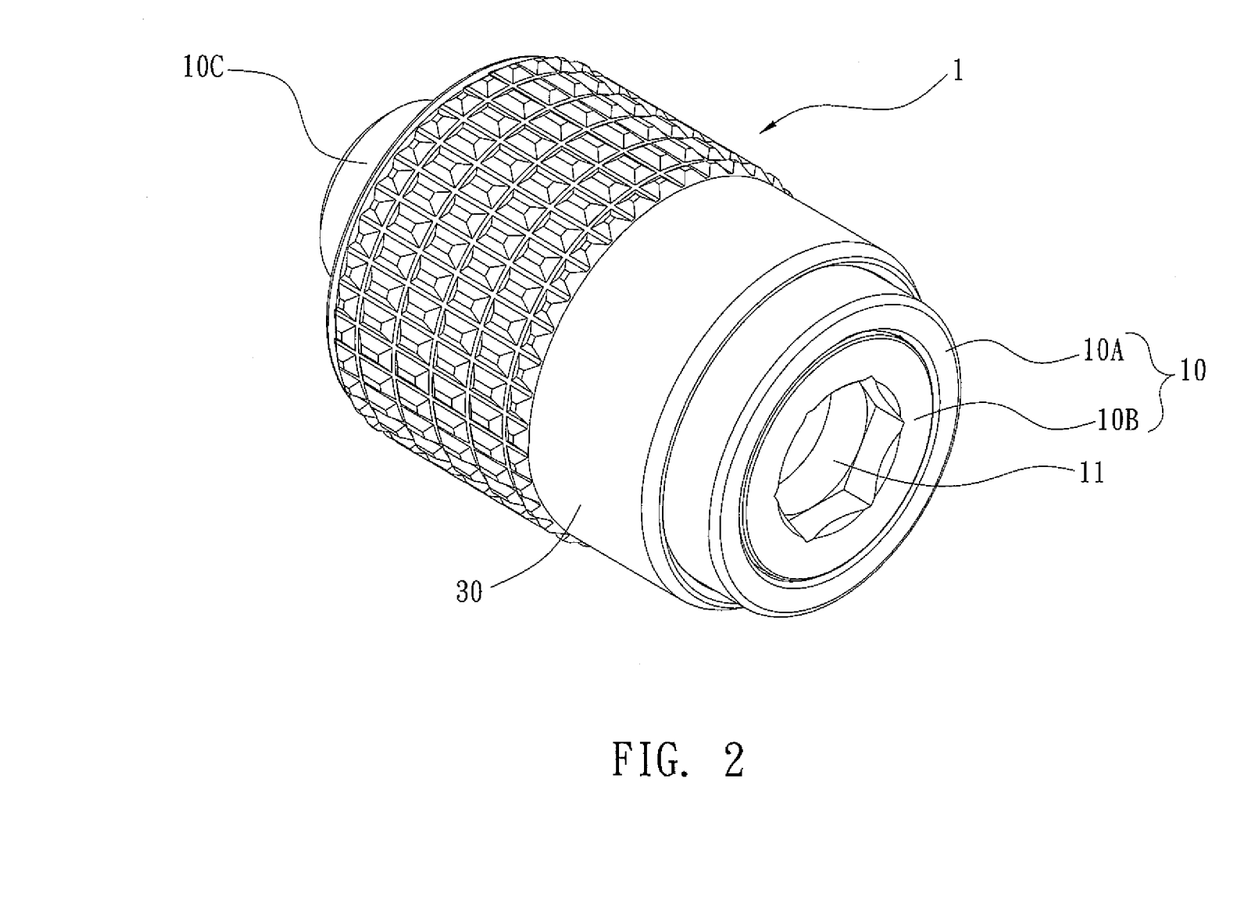
FIG. 2 is a perspective view showing the assembly of the joint structure for the air nozzle according to the first embodiment of the present invention.
Figure 3:
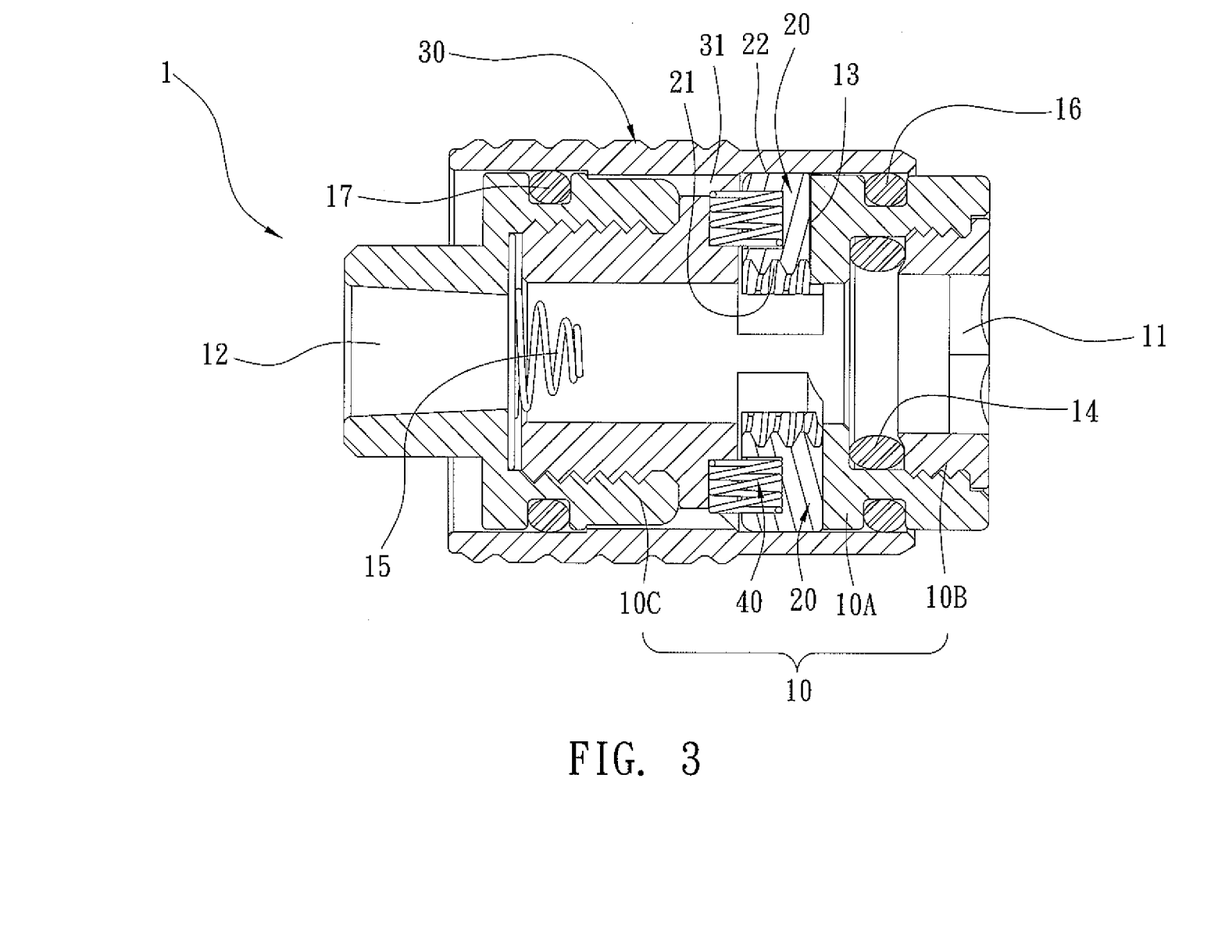
FIG. 3 is a cross sectional view showing the assembly of the joint structure for the air nozzle according to the first embodiment of the present invention.
Figure 4:
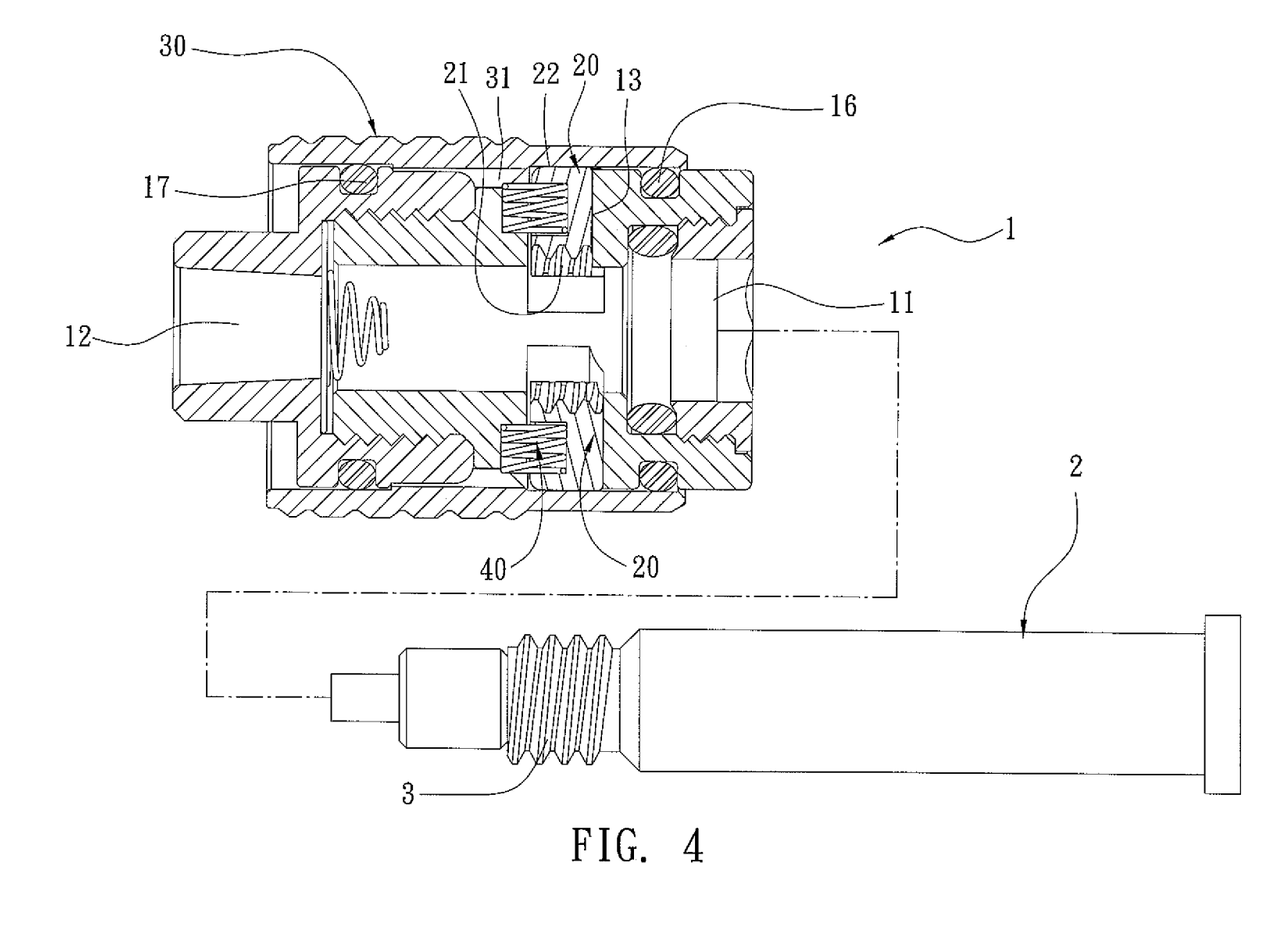
FIG. 4 is a cross section view showing an air nozzle not connecting with a valve joint according to the first embodiment of the present invention.
Figure 5:
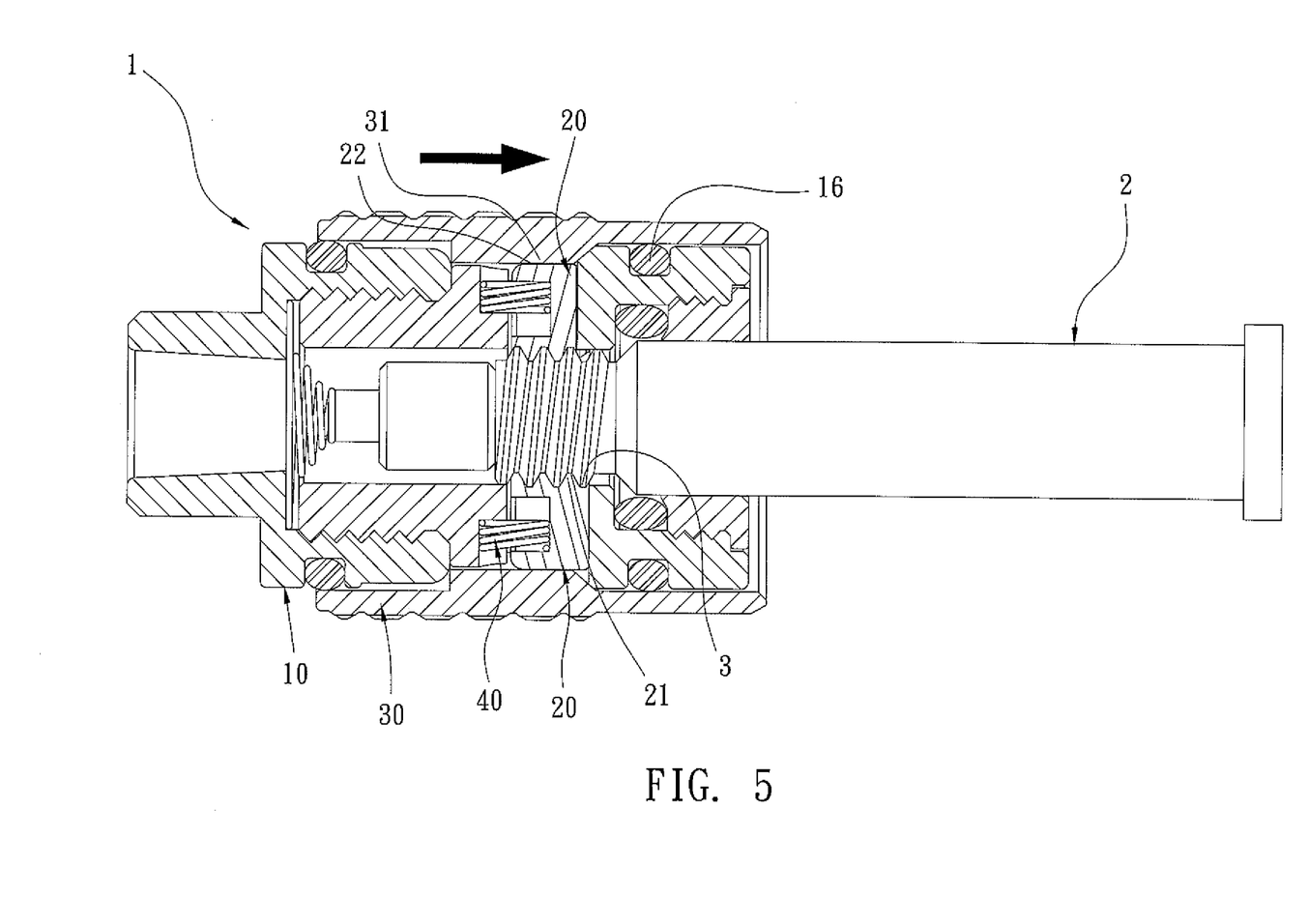
FIG. 5 is a cross section view showing the air nozzle connecting with the valve joint according to the first embodiment of the present invention.
Figure 6:
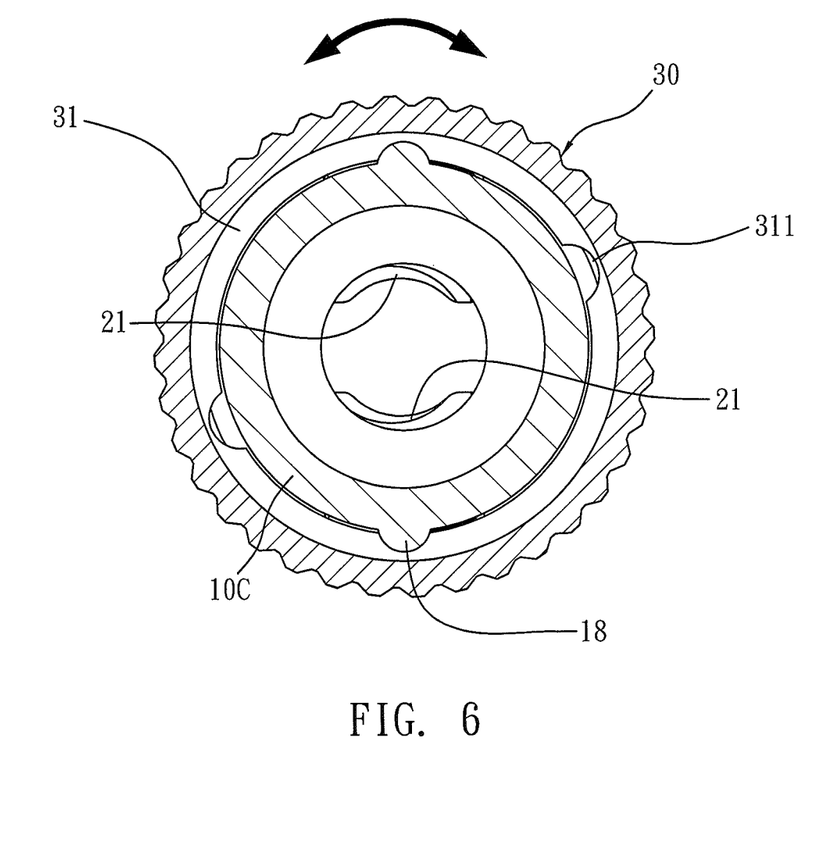
FIG. 6 is a cross section view showing the operation of a controlling assembly of the joint structure for the air nozzle according to the first embodiment of the present invention.
Figure 7:
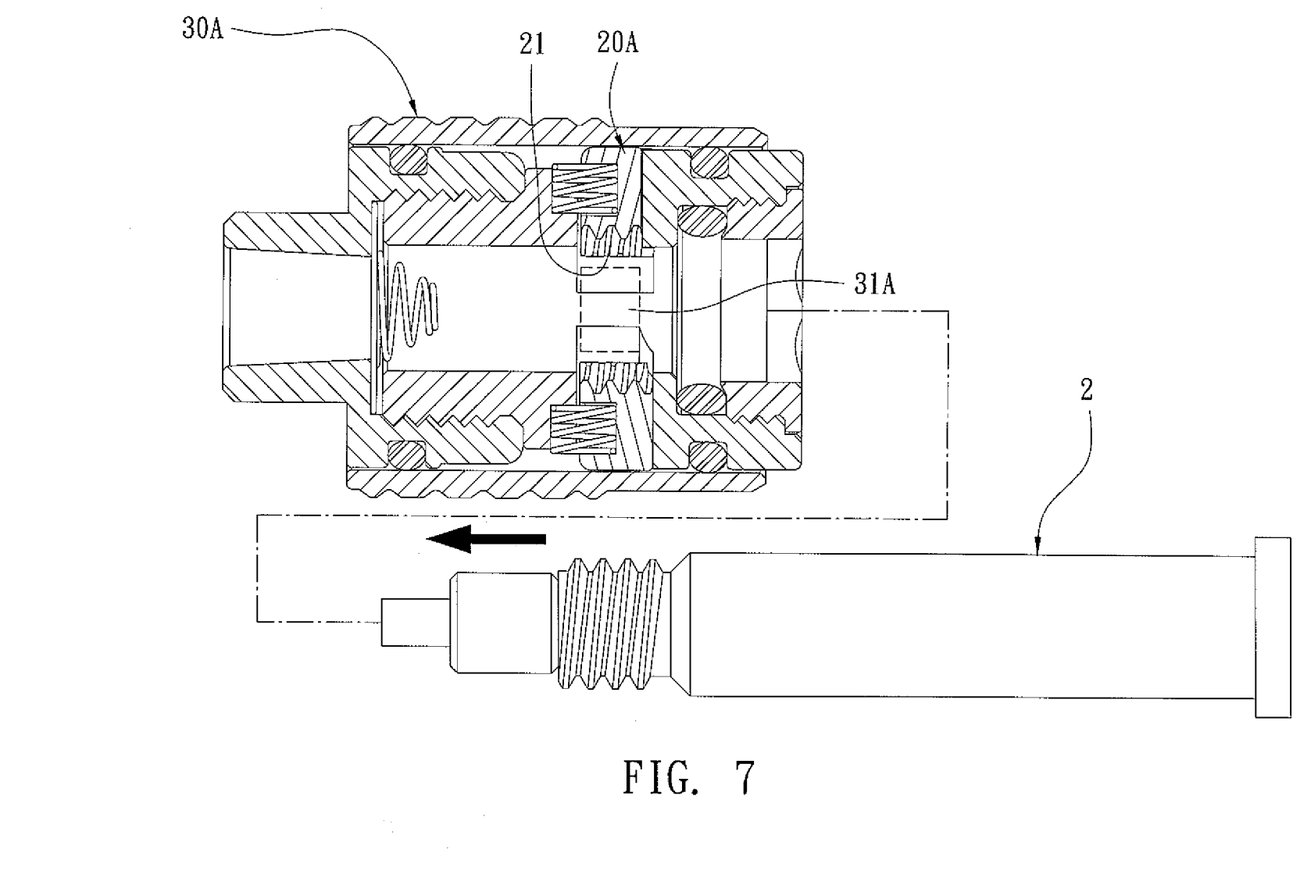
FIG. 7 is a cross section view showing an air nozzle not connecting with a valve joint according to a second embodiment of the present invention.
Figure 8:
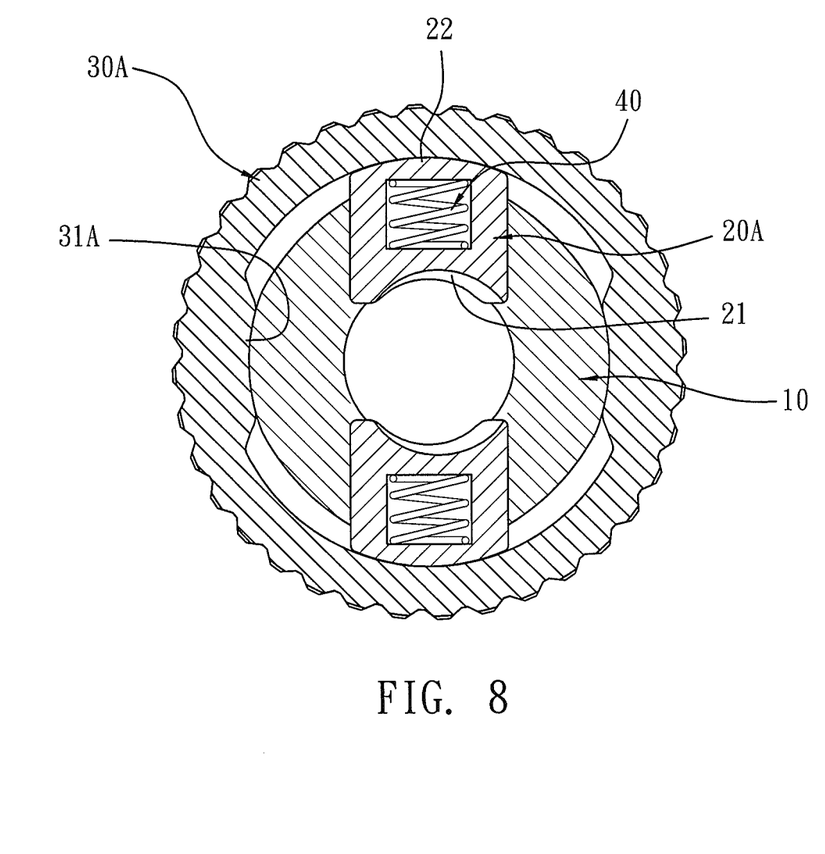
FIG. 8 is another cross section view showing the air nozzle not connecting with the valve joint according to the second embodiment of the present invention.
Figure 9:
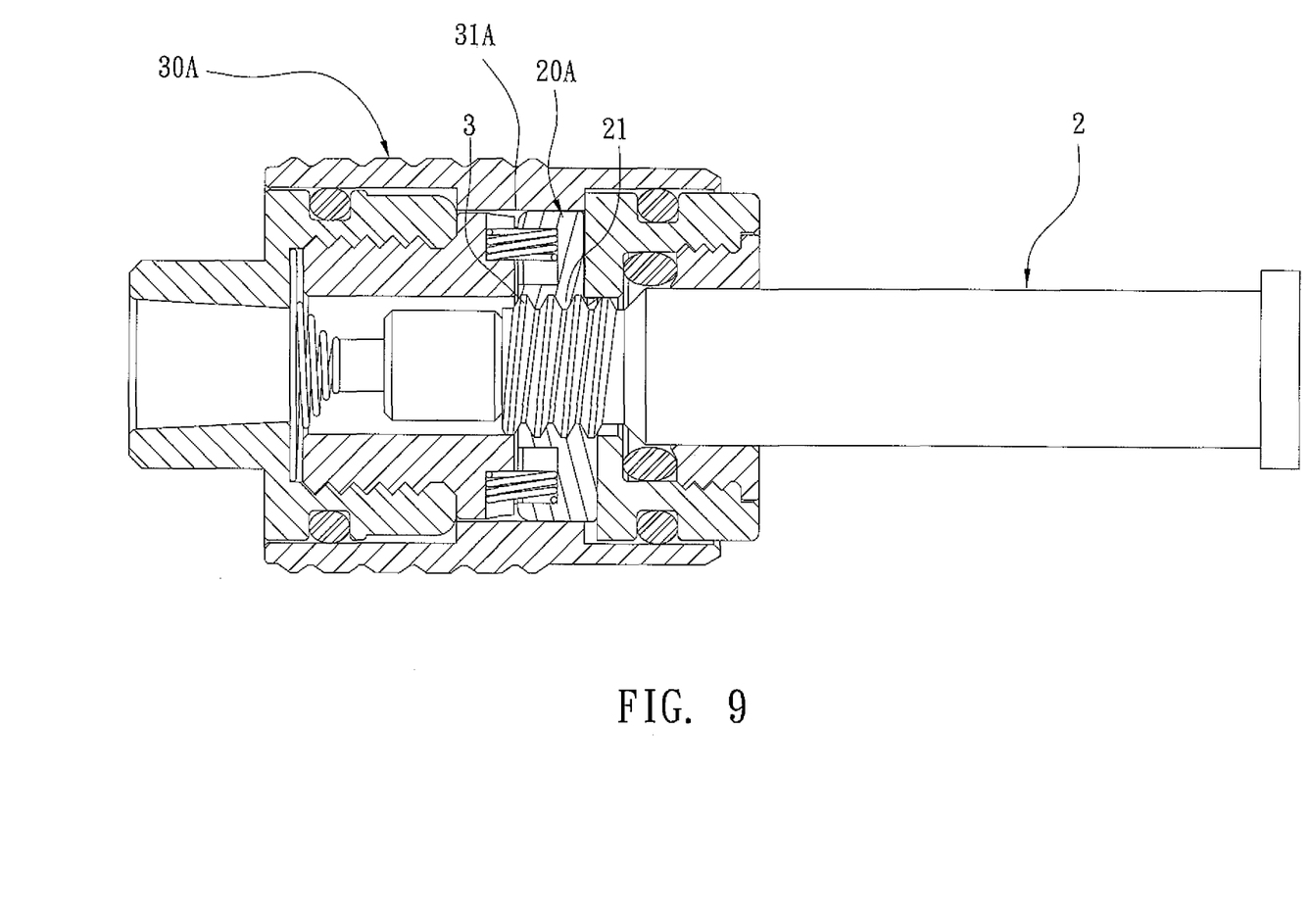
FIG. 9 is a cross section view showing the air nozzle connecting with the valve joint according to the second embodiment of the present invention.
Figure 10:
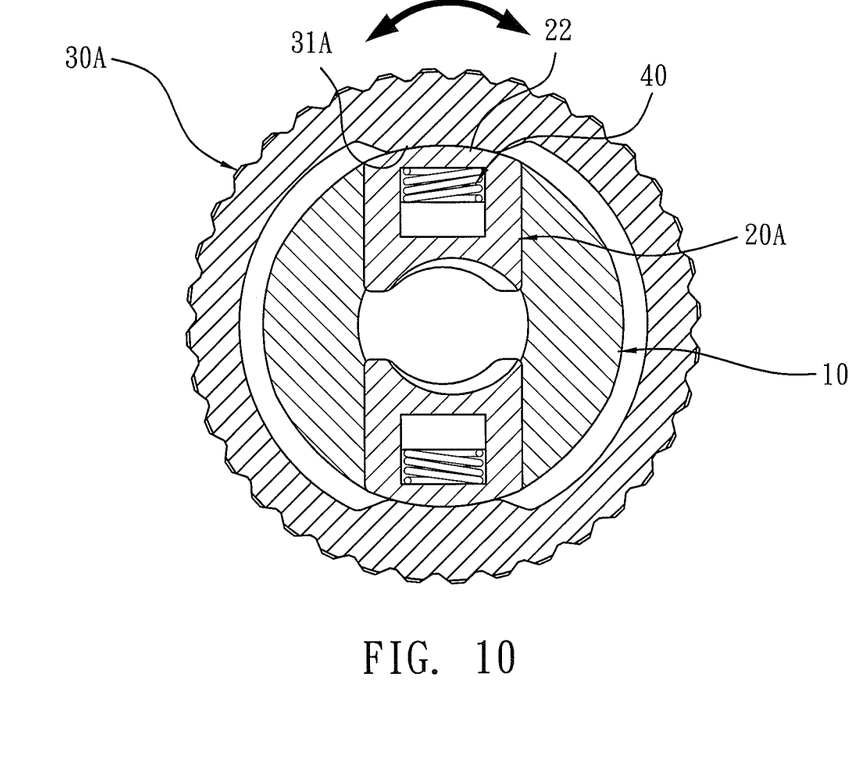
FIG. 10 is another cross section view showing the air nozzle connecting with the valve joint according to the second embodiment of the present invention.

With reference to FIGS. 4 and 5, the hole 11 of the body 10 is applied to insert the air nozzle 2, and the controlling assembly 30 is shifted to limit or unlimit the defining segment 22 of the at least one limiting member 20. When the defining segment 22 of the at least one limiting member 20 is not limited, the at least one limiting member 20 moves outwardly so that the meshing teeth 21 do not engage with the outer threads 3 of the air nozzle 2. Then, the air nozzle 2 inserts into or disengages from the hole 11. Thereby, the hole 11 is provided to insert the air nozzle 2 in the hole 11 or disengage the air nozzle 2 from the hole 11. When the defining segment 22 of the at least one limiting member 20 is limited and does not move, the at least one limiting member 20 moves inwardly, the meshing teeth 21 move into the hole 11, and the meshing teeth 21 engage with the outer threads 3 of the air nozzle 2, such that the outer threads 3 of the air nozzle 2 are limited by the at least one limiting member 20, thus limiting the air nozzle 2 in the hole 11.

The controlling assembly 30 allows controlling or limiting a movement of the at least one limiting member 20 in a sliding manner or in a rotating manner. As shown in FIGS. 1-6, the controlling assembly 30 controls or limits the movement of the at least one limiting member 20 in the sliding manner. The push protrusion 31 is defined around the controlling assembly 30 and has at least one cutout 311 defined therein. The body 10 has at least one engaging rim 18 retaining with the at least one cutout 311, so that the controlling assembly 30 is moved forwardly. The at least one engaging rim 18 controls or limits the movement of the at least one limiting member 20. After the at least one engaging rim 18 moves through the at least one cutout 311, it rotates a certain angle to limit the controlling assembly 30 to move.

As illustrated in FIGS. 7-10, a joint structure for an air nozzle according to a second embodiment of the present invention comprises a controlling assembly 30A controlling or limiting a movement of at least one limiting member 20A in a rotating manner. A push protrusion 31A of the controlling assembly 30A is located on a circumference line of the at least one limiting member 20A and does not contact the at least one limiting member 20A. When the controlling assembly 30A rotates, the push protrusion 31A rotates toward an outer side of the at least one limiting member 20A and presses the at least one limiting member 20A, so that the push protrusion 31A controls or limits the movement of at least one limiting member 20A.

Figure 11:
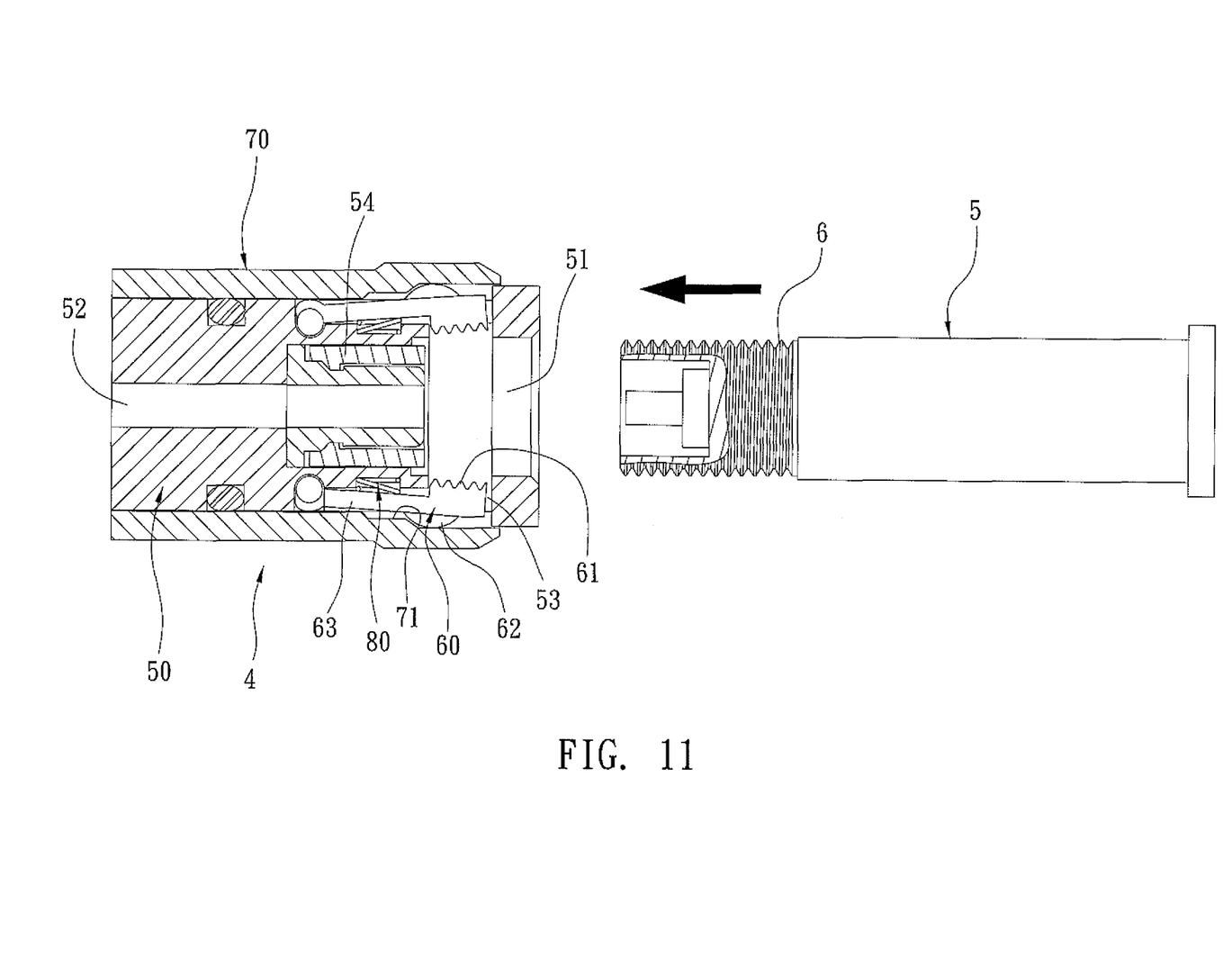
FIG. 11 is a cross section view showing an air nozzle not connecting with a valve joint according to a third embodiment of the present invention.
Figure 12:
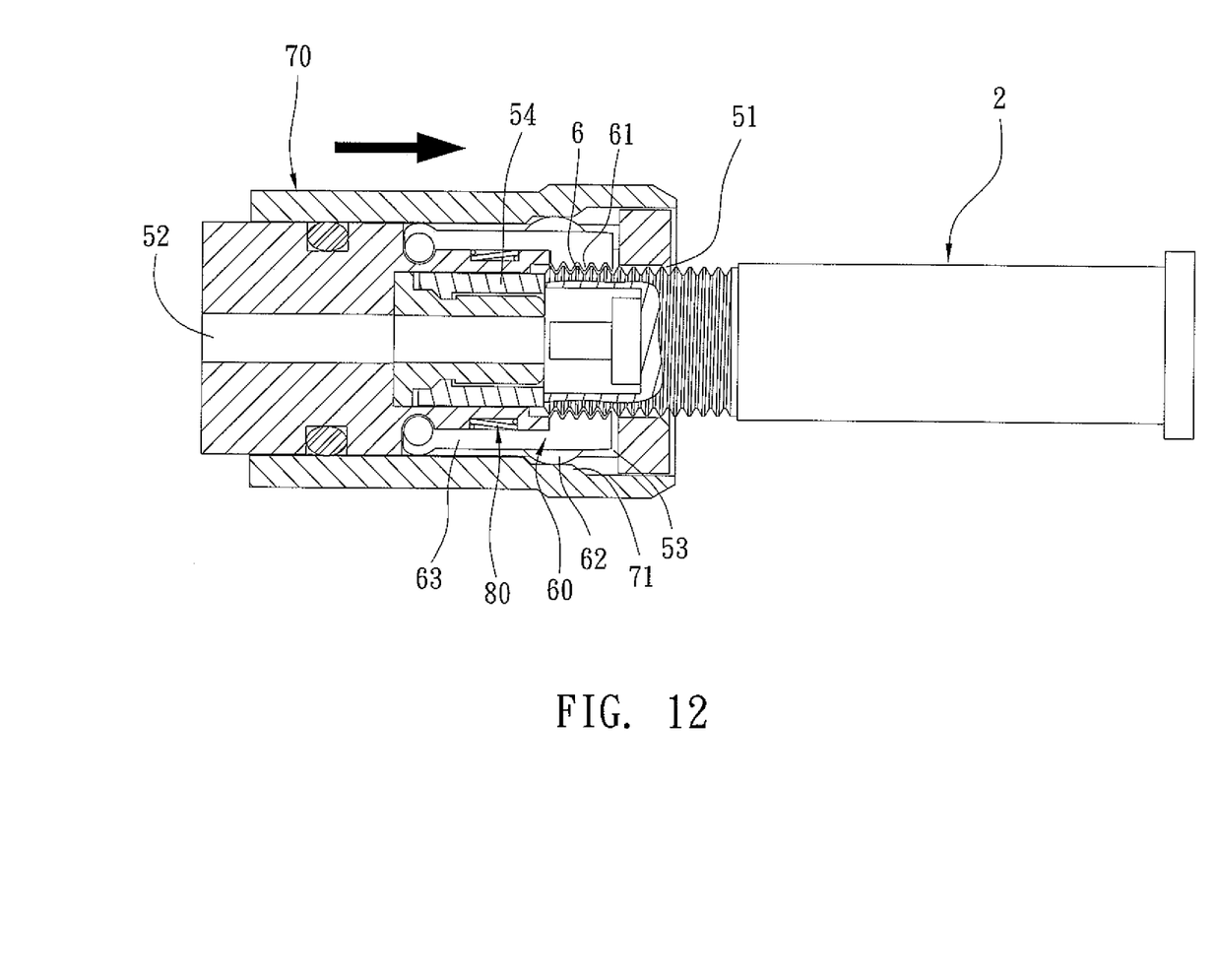
FIG. 12 is a cross section view showing the air nozzle connecting with the valve joint according to the third embodiment of the present invention.

With reference to FIGS. 11 and 12, a valve joint 4 according to a third embodiment of the present invention is connected on an air nozzle 5 to fill air. The air nozzle 5 includes outer threads 6 defined around an outer peripheral side thereof. The valve joint 4 is a Schrader valve joint and comprises a body 50 having a hole 51 defined therein, an inlet 52 communicating with the hole 51, and the hole 51 having a seal plug 54 defined therein to match with the valve joint 4.

At least one limiting member 60 is secured and moves in at least one orifice 53 and has meshing teeth 61 formed on one end thereof to correspond to the hole 51. The meshing teeth 61 engage with the outer threads 6 of the air nozzle 5, and the limiting member 60 has a defining segment 62 arranged on another end thereof. The at least one limiting member 60 has an extension 63 extending outwardly from one end thereof and axially connected with the body 50.

A controlling assembly 70 formed in a hollow cylinder shape and fitted on the body 50. The controlling assembly 70 is used to control the at least one limiting member 60 to move in the at least one orifice 53 and has a push protrusion 71 defined therein. The controlling assembly 70 moves so that the push protrusion 71 pushes and limits the defining segment 62 of the at least one limiting member 60, such that the at least one limiting member 60 is controlled by the controlling assembly 70 to move as shown in FIG. 12.

A spring 80 is defined between the body 50 and the extension 63 of the at least one limiting member 60 and is used to push the at least one limiting member 60 to move outwardly.

Figure 13:
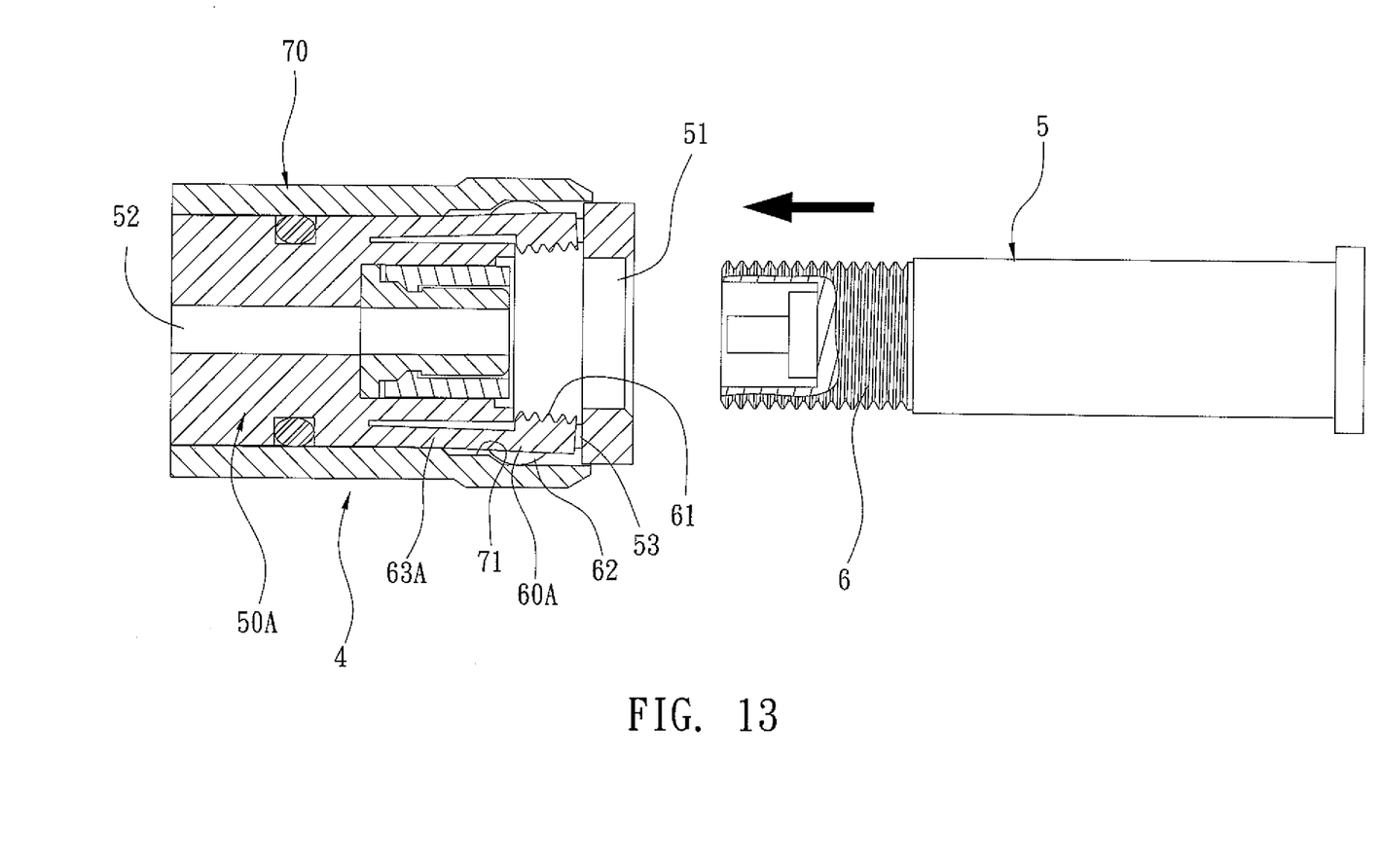
FIG. 13 is a cross section view showing an air nozzle not connecting with a valve joint according to a fourth embodiment of the present invention.
Figure 14:
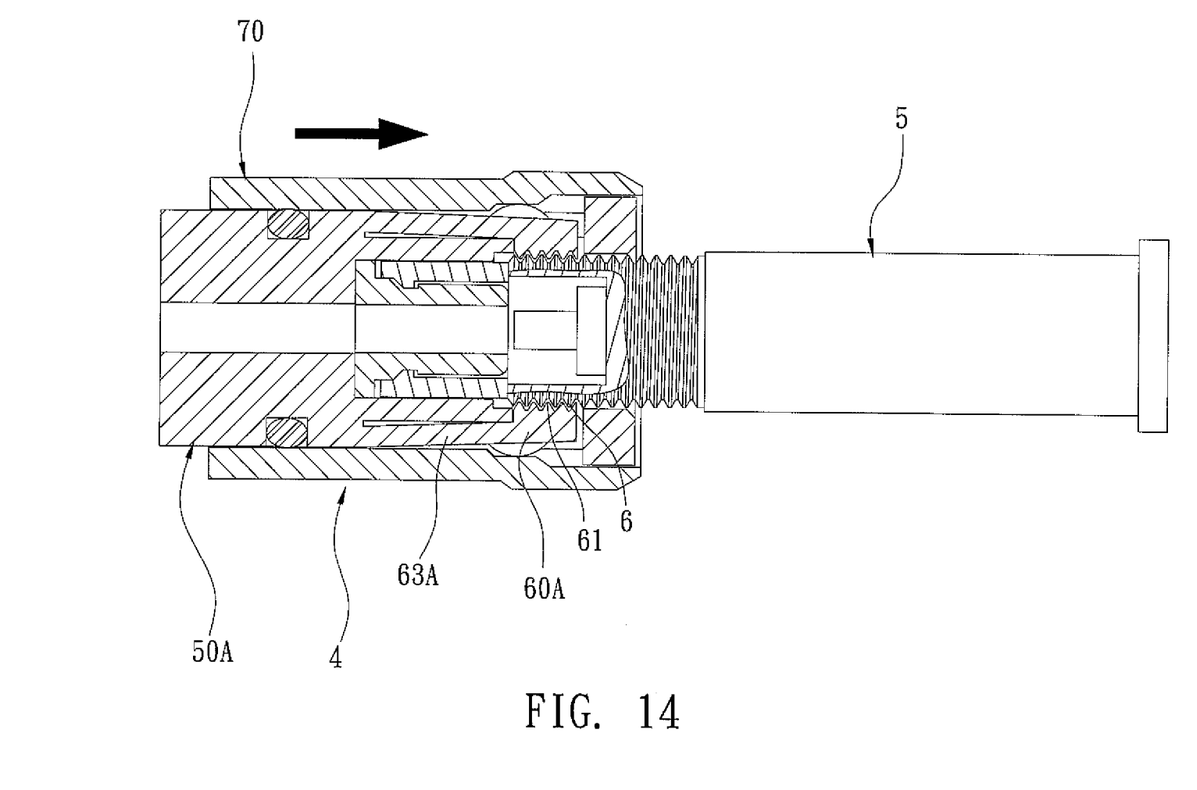
FIG. 14 is a cross section view showing the air nozzle connecting with the valve joint according to the fourth embodiment of the present invention.

Referring further to FIGS. 13 and 14, a difference of a valve joint 4 of a fourth embodiment of the present invention from that of the second embodiment comprises at least one limiting member 60A having an extension 63A extending outwardly from one end of the at least one limiting member 60A and integrally formed with a body 50A. The extension 63A has flexibility to replace the spring 80 of the second embodiment, so the spring 80 of the second embodiment is not necessary in this fourth embodiment.

Thereby, the valve joint of the present invention has the following advantages:

1. When the controlling assembly 30 of the valve joint 1 does not limit the at least one limiting member 20, a user allows inserting the air nozzle 2 into the hole 11 of the valve joint 1 by one hand, and the controlling assembly 30 rotates with an insertion force to shift the controlling assembly 30 to limit the at least one limiting member 20. Alternately, after inserting the air nozzle 2, the controlling assembly 30 rotates directly and shifts to limit the at least one limiting member 20, thus operating the valve joint 1 easily and smoothly.

2. When connecting the valve joint 1 with the air nozzle 2, the outer threads 3 of the air nozzle 2 engage with the meshing teeth 21 of the at least one limiting member 20 to limit or not limit the at least one limiting member 20 by shifting the controlling assembly 30, and the meshing teeth 21 engage with the outer threads 3 of the air nozzle 2, thus limiting the air nozzle 2 in the hole 11. Thereby, the valve joint 1 is connected with the air nozzle 2 quickly, has a small size, is assembled securely, and is suitable for a high-pressure air fill.

While various embodiments in accordance with the present invention have been shown and described, it is clear to those skilled in the art that further embodiments may be made without departing from the scope of the present invention.

What is claimed is:

1. A valve joint for connecting on an air nozzle, with the air nozzle including outer threads defined around an outer peripheral side thereof, with the valve joint comprising:
    a body having a hole defined therein, an inlet communicating with the hole, at least one orifice penetrating from an exterior environment to the hole; a middle cylinder, a front cylinder, and a rear cylinder, wherein the front cylinder is screwed with one end of the middle cylinder and is used to fix a first seal ring, wherein the rear cylinder is screwed with another end of the middle cylinder and is applied to fix a compression spring, wherein the body further has a second seal ring disposed on one end of an outer peripheral side thereof and a third seal ring mounted on another end of the outer peripheral side thereof and the rear cylinder, wherein the second seal ring and the third seal ring are provided to close a front side and a rear side of the at least one orifice, wherein the first seal ring is served to close the air nozzle, wherein the compression spring is used for pushing the air nozzle;
    at least one limiting member secured and moving in the at least one orifice and having meshing teeth formed on one end thereof, with the meshing teeth adapted to engage with the outer threads of the air nozzle, and with the limiting member having a defining segment arranged on another end thereof; and
    a controlling assembly fitted on the body and used to control the at least one limiting member to move in the at least one orifice;
    with the hole of the body adapted for insertion of the air nozzle, with the controlling assembly shifted to limit or unlimit the defining segment of the at least one limiting member, wherein when the defining segment of the at least one limiting member is not limited, the at least one limiting member moves outwardly so that the meshing teeth do not engage with the outer threads of the air nozzle allowing the air nozzle to be inserted into or disengaged from the hole; and when the defining segment of the at least one limiting member is limited and does not move, the at least one limiting member moves inwardly, and the meshing teeth move into the hole so that the meshing teeth are adapted to engage with the outer threads of the air nozzle.

2. The valve joint for connecting on the air nozzle as claimed in claim 1, wherein the controlling assembly controls and limits a movement of the at least one limiting member in a sliding manner.

3. The valve jointer for connecting on the air nozzle as claimed in claim 1, wherein the controlling assembly controls and limits a movement of the at least one limiting member in a rotating manner, and wherein a spring is defined between the body and the at least one limiting member and is used to push the at least one limiting member to move outwardly.

4. The valve joint for connecting on the air nozzle as claimed in claim 1, wherein a spring is defined between the body and the at least one limiting member and is used to push the at least one limiting member to move outwardly.

5. The valve joint for connecting on the air nozzle as claimed in claim 1, wherein the at least one orifice of the body is non-circular.

6. The valve joint for connecting on the air nozzle as claimed in claim 1, wherein the controlling assembly has a push protrusion defined therein, and wherein the controlling assembly moves so that the push protrusion pushes and limits the defining segment of the at least one limiting member, such that the at least one limiting member is controlled by the controlling assembly to move.

7. The valve joint for connecting on the air nozzle as claimed in claim 6, wherein the controlling assembly controls and limits a movement of the at least one limiting member in a rotating manner, and wherein a spring is defined between the body and the at least one limiting member and is used to push the at least one limiting member to move outwardly.

8. The valve joint for connecting on the air nozzle as claimed in claim 7, wherein the push protrusion is defined around the controlling assembly and has at least one cutout defined therein, and wherein the body has at least one engaging rim retaining with the at least one cutout so that the controlling assembly is moved forwardly and rotates an angle to be limited.

* * * * *